Figure 1:
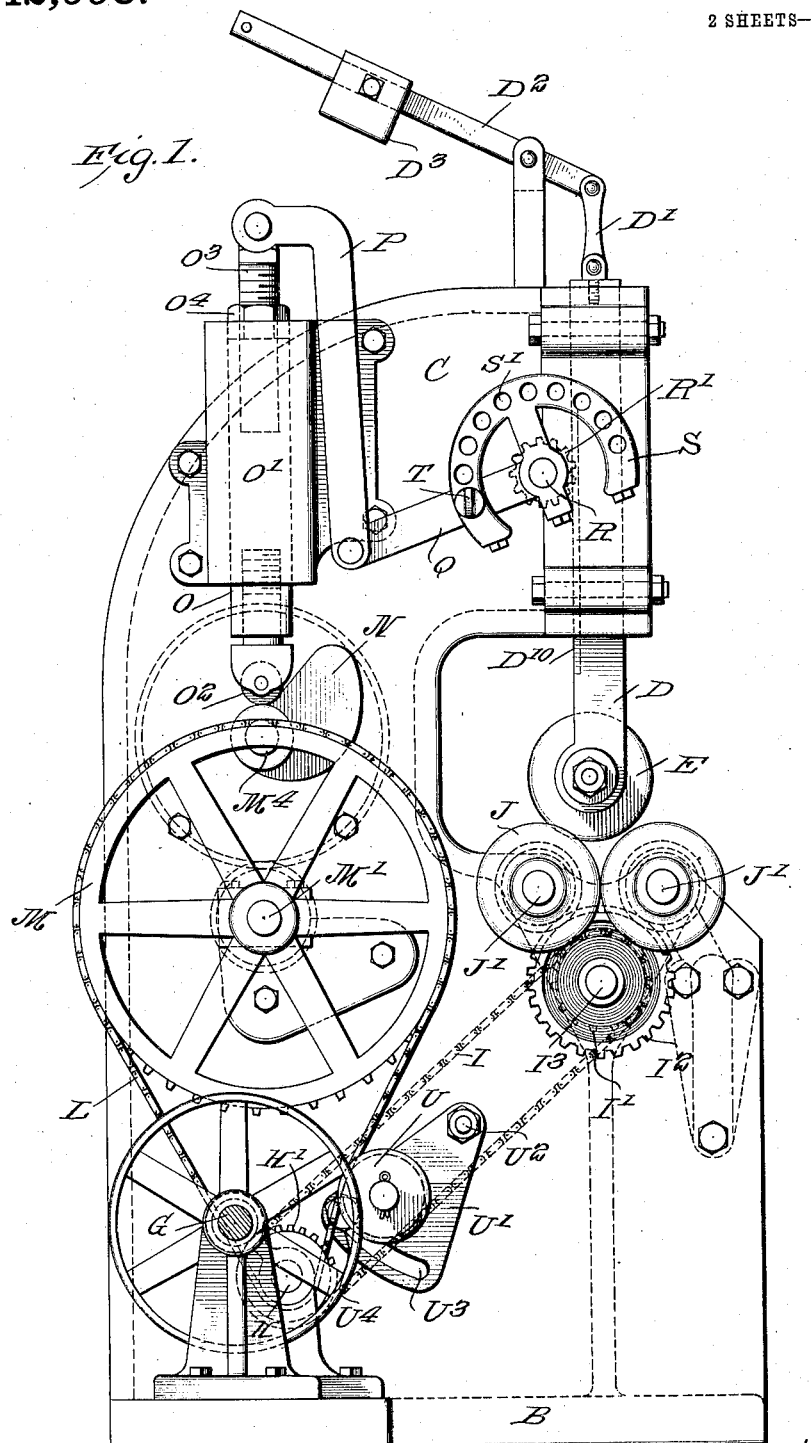

L. R. BLACKMORE.
PIPE CUTTING MACHINE.
APPLICATION FILED FEB. 4, 1911.

1,042,998.

Patented Oct. 29, 1912.
2 SHEETS—SHEET 1.

WITNESSES:
E. M. Callaghan
Perry B. Turpin

INVENTOR
LAWRENCE R. BLACKMORE
BY Munn & Co.
ATTORNEYS

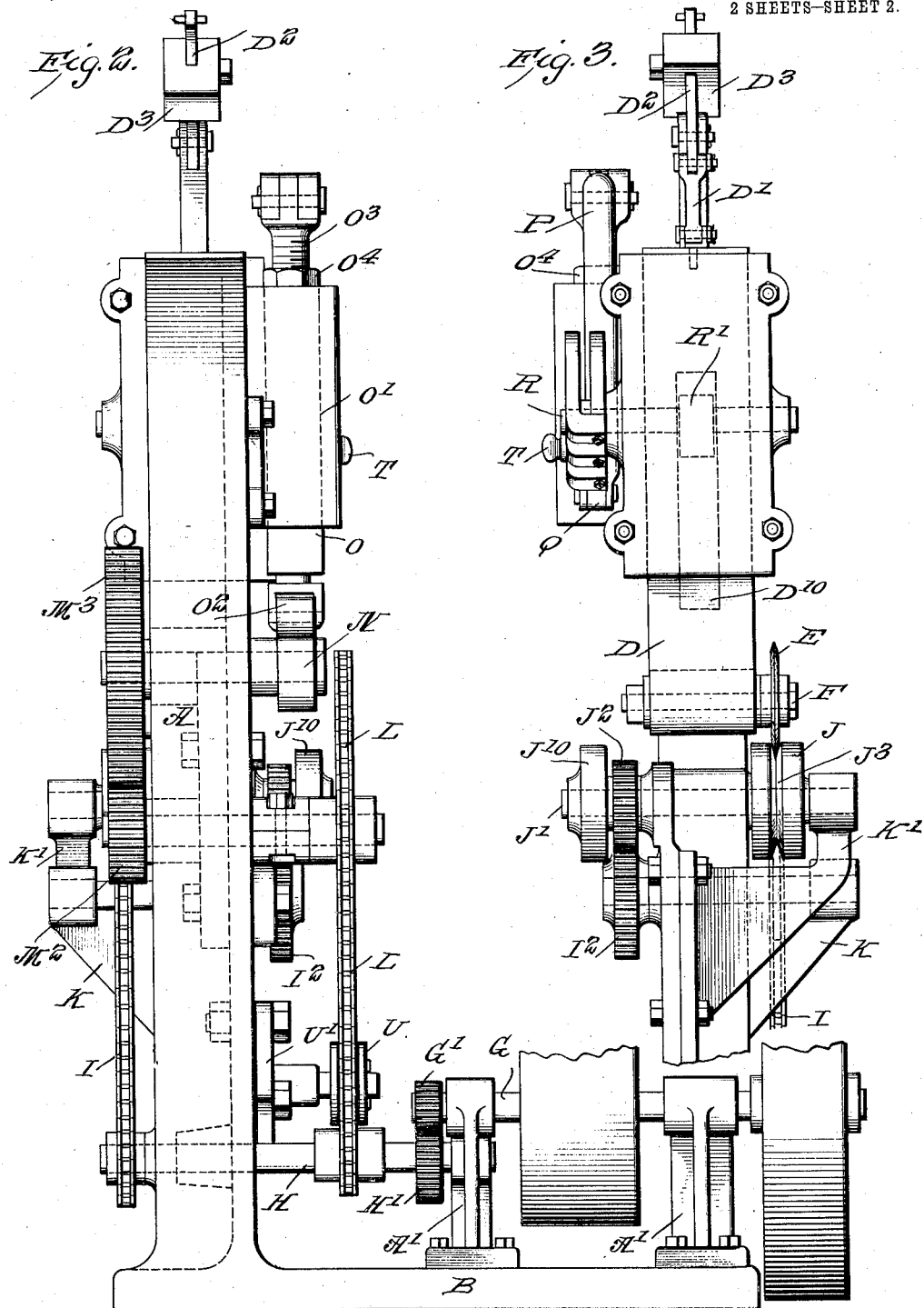

UNITED STATES PATENT OFFICE.

LAWRENCE R. BLACKMORE, OF McKEESPORT, PENNSYLVANIA.

PIPE-CUTTING MACHINE.

1,042,998.  Specification of Letters Patent.  Patented Oct. 29, 1912.

Application filed February 4, 1911. Serial No. 606,586.

*To all whom it may concern:*

Be it known that I, LAWRENCE R. BLACKMORE, a citizen of the United States, and a resident of McKeesport, in the county of Allegheny and State of Pennsylvania, have invented certain new and useful Improvements in Pipe-Cutting Machines, of which the following is a specification.

This invention is an improvement in pipe cutting machines, and the invention has for an object to provide a novel construction for driving the base or supporting rollers as well as for driving the cam for directly operating the cutter.

The invention also seeks to provide a novel means for adjusting the operation of the cutter to suit the diameter of the pipe being cut.

The invention also provides a novel means for operating the cutter.

The invention has for further objects, other improvements and consists in certain novel constructions and combinations of parts as will be hereinafter described and claimed.

In the drawings Figure 1 is a side elevation of a machine embodying my invention. Fig. 2 is a front elevation thereof, parts being broken away. Fig. 3 is an elevation of the machine from the side opposite that shown in Fig. 2.

In carrying out my invention, I provide a suitable frame A having a base B and a head C, the latter having vertical guide ways in which is movable vertically the slide D carrying the disk cutter E, the latter being free to revolve on bearings F supported at the lower end of the slide D and the slide D being connected at its upper end by a link D' with the lever D$^2$ having a counterbalancing weight D$^3$, as best shown in Fig. 1. By this construction, the cutter and its slide when lowered to the position shown in Fig. 1, may be readjusted to its elevated position when released, as more fully described hereinafter.

The main frame supports bearings A' in which is journaled the drive shaft G which may be operated in any suitable manner and is geared by a pinion G' with a pinion H' on what may be termed the master shaft H journaled in suitable bearings in the frame A near the lower end thereof, as shown in Figs. 1 and 2. This master shaft extends through the main frame and is provided on one side thereof with a sprocket wheel meshed by a sprocket chain I, which extends upwardly and forwardly and meshes with a sprocket wheel I' on a shaft I$^3$, which shaft I$^3$ also has a pinion I$^2$ geared with and driving the base rollers J which form a support for the pipe being driven and a means for turning the said pipe in contact with the cutter E when the latter is lowered against the pipe.

As best shown in Fig. 3, the gear I$^2$ on the shaft I$^3$ and the gears J$^2$ on the shafts J' of the rollers J are arranged on one side of the main frame while the said rollers J are arranged on the opposite side of the frame and the shafts J' extend beyond the rollers J and are supported at their outer ends by the arms K' of brackets K secured to the main frame, as shown in Fig. 3. The shafts J' are also provided at their ends opposite the rollers J with rollers J$^{10}$ similar to the rollers J and alined therewith and coöperating with the rollers J in supporting a pipe during the cutting operation. It should be noted, however, that the rollers J are grooved at J$^3$ to receive the cutting disk E while such a groove is not necessary in the rollers J$^{10}$. However, by extending the shafts J' through the main frame and supporting the rollers J and J$^{10}$ on said shafts on opposite sides of the main frame, I secure a broad base for supporting the pipe. The shaft H is also provided with a sprocket pinion geared with a sprocket chain L, which chain L extends upwardly and around a sprocket wheel M on a counter-shaft M'. This shaft M' is journaled in the main frame and has the sprocket wheel M on one side of the said frame and a gear wheel M$^2$ on the opposite side of the said frame, the said gear wheel M$^2$ meshing with the gear wheel M$^3$ on a shaft M$^4$ journaled in the main frame, the shaft M$^4$ being provided on the side of the main frame opposite the gear M$^3$ with a cam N. This cam N reciprocates a slide rod O movable vertically in guides O' carried by the main frame and having at its lower end a roller O$^2$ bearing against the cam N in the operation of the machine. As the shaft M$^4$ is revolved, the cam N will lift the slide rod and permit the same to lower as more fully described hereinafter.

The roller O$^2$ is connected adjustably with the slide rod and the said rod is preferably made in sections with an upper adjustable section O$^3$ threaded into the upper end of the body of the rod and secured in any suitable adjustment by a jam nut O$^4$.

A link P is pivoted at its upper end to the upper section O³ of the slide rod O and at its lower end to a rocker arm Q forming a part of the means for operating the cutter slide, as shown in Fig. 1.

The rocker arm Q is secured adjustably to a shaft R journaled in the framing and on this shaft R is secured a pinion or gear R′ which meshes with a rack D¹⁰ on the cutter slide so that the said gear R will give the downward or cutting stroke to the slide D and will permit the counter-balancing devices D′, D² and D³ to elevate or re-adjust the said slide D.

For gaging or adjusting the height of the cover to pipes of different diameters, I secure the pinion or gear R′ adjustably in connection with the rocker Q and in doing this I employ a segment S fixed to the shaft R and having a series of openings S′ any one of which may be entered by the fastening device T which secures the segment adjustably to the rocker Q and so secures the adjustable connection between the pinion or gear R′ and the rocker desirable for securing the adjustment of the cutter to suit pipes of different sizes.

In the operation of the described construction, it will be noticed that the slide rod O will be forced upward by the action of the cam N, which is given motion in the manner before described. As the link P pulls up the outer end of the rocker Q, the teeth of the pinion R′ meshing with the cutter slide D, will force said slide downward in its cutting stroke, the slide being readjusted by the counterbalancing devices.

As best shown in Fig. 1, I provide an idler U for tightening the sprocket chain L, the said idler being carried by bearings on a plate U′ pivoted at U² and slotted at its swinging end at U³ for the passage of the bolt U⁴ by which the tightener may be secured in any desired adjustment.

I claim:

1. In a machine, substantially as described, the combination of a framing, a pair of bed rollers for supporting the work to be operated on, means for driving these rollers whereby to turn the said work, a cutting disk opposing the said rollers, a slide carrying said disk and having a toothed rack, counterbalancing devices for lifting or readjusting said slide, a shaft having a pinion or gear meshing with the rack of the slide, a segment secured to said shaft, a rocker, means securing said segment adjustably to the rocker whereby the rocker may be secured in any desired relation to the pinion or gear, a link connected at one end with the rocker, an operating slide to which said link is connected, a roller at the lower end of said slide, a cam operating upon said roller to elevate the slide, and means for operating the cam, substantially as set forth.

2. In a machine, substantially as described, the combination of a framing, a pair of bed rollers for supporting the work to be operated on, means for driving these rollers whereby to turn the said work, a cutting disk opposing the said rollers, a slide carrying said disk and having a toothed rack, counterbalancing devices for lifting or readjusting said slide, a shaft having a pinion or gear meshing with the rack of the slide, a segment secured to said shaft, a rocker, means securing said segment adjustably to the rocker whereby the rocker may be secured in any desired relation to the pinion or gear and means for operating the rocker, substantially as set forth.

3. In a machine, substantially as described, the combination of a framing, shafts journaled in the framing and projecting at their opposite ends beyond the same, said shafts being spaced apart, rollers opposite each other on their respective ends of the said shafts, and grooved circumferentially, co-operating rollers on the opposite ends of said shafts, means for turning the said shafts, a cutting disk arranged opposite the grooved rollers, a slide carrying said cutting disk and means for operating the slide, substantially as set forth.

4. The combination in a machine, substantially as described, of a main frame, a drive shaft, a master shaft geared with the drive shaft, supporting rollers for the work to be operated on, a cutter opposite said rollers, a slide carrying said cutter, gearing on one side of the main frame between the master shaft and the supporting rollers, a cam for operating the cutter shaft and gearing between the master shaft and said cam and on the opposite side of the main frame from the said first gearing, substantially as set forth.

5. The combination, substantially as herein described, of a cutter, a pinion or gear for moving the cutter in the operative stroke of the latter, means for operating the pinion or gear to a determined extent, and means for adjusting the pinion or gear circumferentially with respect to its operating means whereby the cutter may be operated to the determined extent and the limits of its movement may be varied substantially as set forth.

6. The combination in a machine, substantially as described, of a cutter, a slide for operating the cutter, a rack and pinion for moving the slide in the operative stroke of the cutter, and means independent of the means for moving said slide in its operative stroke for readjusting the slide, substantially as set forth.

7. The combination in a machine substantially as described, of a cutter, a slide carrying said cutter and having a rack, a pinion or gear meshing with said rack, means for adjusting the operative engagement of the gear with the rack, and means for operating the gear to give the operative stroke to the cutter, substantially as set forth.

8. The combination in a machine, substantially as described, of a cutter, a slide for operating the cutter, a rack and pinion for moving the slide, an arm for rocking the pinion and a segment between the arm and pinion whereby the relation of the pinion to the arm may be varied substantially as set forth.

LAWRENCE R. BLACKMORE.

Witnesses:
A. T. Darr,
H. E. Marker.